(12) United States Patent
Yuuki et al.

(10) Patent No.: US 10,976,611 B2
(45) Date of Patent: Apr. 13, 2021

(54) DISPLAY DEVICE

(71) Applicant: Mitsubishi Electric Corporation, Tokyo (JP)

(72) Inventors: Akimasa Yuuki, Tokyo (JP); Yasunori Niwano, Tokyo (JP); Kazunori Okumoto, Tokyo (JP); Shinsaku Yamaguchi, Tokyo (JP); Toshiaki Fujino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/039,728

(22) Filed: Jul. 19, 2018

(65) Prior Publication Data

US 2019/0064570 A1 Feb. 28, 2019

(30) Foreign Application Priority Data

Aug. 25, 2017 (JP) .............................. JP2017-162166

(51) Int. Cl.
*G02F 1/13363* (2006.01)
*G02F 1/1335* (2006.01)
*G02F 1/1347* (2006.01)
*G02F 1/1337* (2006.01)

(52) U.S. Cl.
CPC ...... *G02F 1/13363* (2013.01); *G02F 1/13471* (2013.01); *G02F 1/133528* (2013.01); *G02F 1/133753* (2013.01); *G02F 2001/133531* (2013.01); *G02F 2001/133633* (2013.01)

(58) Field of Classification Search
CPC .......... G02F 1/13363; G02F 1/133528; G02F 1/133753; G02F 2001/133531;
(Continued)

(56) References Cited

U.S. PATENT DOCUMENTS

| 5,583,677 A | 12/1996 | Ito et al. |
| 2006/0216436 A1* | 9/2006 | Obara .................. G02B 5/3033 428/1.3 |

(Continued)

FOREIGN PATENT DOCUMENTS

| JP | 3315476 B2 | 8/2002 |
| JP | 2007-164125 A | 6/2007 |
| JP | 5648361 B2 | 1/2015 |

*Primary Examiner* — Shan Liu
(74) *Attorney, Agent, or Firm* — Studebaker & Brackett PC

(57) ABSTRACT

The object is to provide a display device with a superior viewing angle. The display device includes a display portion, a liquid-crystal barrier portion, first to third polarizing layers, and at least one viewing-angle compensation layer. The liquid-crystal barrier portion is disposed on one side of the display portion, and adjusts an intensity of light of the display portion. The first polarizing layer is disposed opposite to the liquid-crystal barrier portion relative to the display portion. The second polarizing layer is interposed between the display portion and the liquid-crystal barrier portion. The third polarizing layer is disposed opposite to the display portion relative to the liquid-crystal barrier portion. The viewing-angle compensation layer is interposed between the liquid-crystal barrier portion and the third polarizing layer, and no viewing-angle compensation layer is interposed between the second polarizing layer and the liquid-crystal barrier portion.

2 Claims, 6 Drawing Sheets

(58) Field of Classification Search
CPC ..... G02F 2001/133633; G02F 1/13471; G02F 1/0063; G02F 1/0131; G02F 1/1395; G02F 1/133634; G02F 2001/0151; G02F 2001/13356; G02F 2001/133562; G02F 2001/133565; G02F 2001/133567; G02F 2202/40; G02F 2413/00; G02F 2413/11; G02F 2413/12; G02F 2413/14; G02F 2413/08; G02F 1/292; G02F 1/134309; G02F 1/133371; G02F 1/1347; G02F 2201/305; G02F 2203/24; G02F 2203/22; G02B 5/1828; G02B 26/0808
USPC .................................. 349/117–122, 201–202
See application file for complete search history.

(56) References Cited

U.S. PATENT DOCUMENTS

| | | | |
|---|---|---|---|
| 2009/0147186 A1* | 6/2009 | Nakai | G02F 1/13471 349/74 |
| 2009/0153784 A1 | 6/2009 | Kiya | |
| 2010/0073604 A1* | 3/2010 | Okuyama | B29D 11/00644 349/75 |
| 2011/0032454 A1* | 2/2011 | Ikeno | G02F 1/133514 349/81 |
| 2012/0038854 A1 | 2/2012 | Inoue | |
| 2012/0038871 A1* | 2/2012 | Inoue | H04N 13/317 349/122 |
| 2012/0194766 A1* | 8/2012 | Kaihoko | G02F 1/133634 349/96 |
| 2013/0321723 A1* | 12/2013 | Ishiguro | G02F 1/1313 349/15 |
| 2014/0078423 A1* | 3/2014 | Suzuki | G02F 1/13392 349/12 |
| 2014/0307188 A1* | 10/2014 | Kikuchi | G02B 30/27 349/15 |
| 2015/0160465 A1* | 6/2015 | Fujino | G02B 30/25 349/12 |
| 2016/0293895 A1* | 10/2016 | Kim | H01L 51/525 |
| 2018/0113334 A1* | 4/2018 | Fang | G02F 1/13363 |
| 2018/0232075 A1* | 8/2018 | Yang | G09G 5/00 |

* cited by examiner

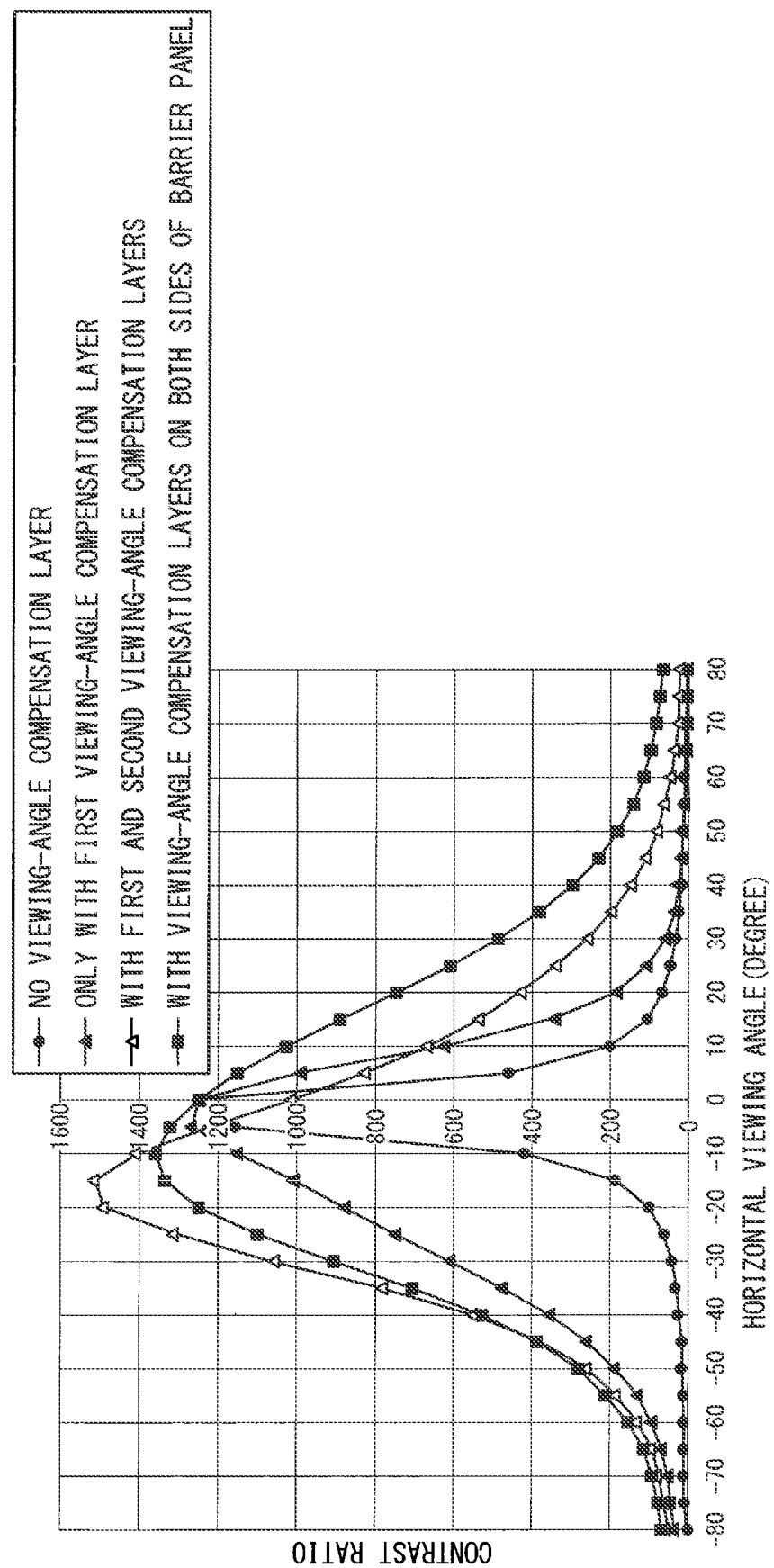
F I G. 5

DISPLAY DEVICE

BACKGROUND OF THE INVENTION

Field of the Invention

The present invention relates to a display device that compensates for a viewing angle.

Description of the Background Art

In recent years, various optical compensation techniques have realized display devices having a wider image-viewable angular region (hereinafter referred to as a "viewing angle") and having superior display quality, for example, a higher contrast ratio in the region. Example optical compensation methods to be applied to the display devices include introduction of a phase difference film and a viewing-angle compensation film to a liquid-crystal display. The viewing-angle compensation film has refractive-index anisotropy exhibited in, for example, alignment of liquid crystals. Thus, modulating phases of light that passes through the viewing-angle compensation film can reduce light leakage at a viewing side of the display device.

Proposed display devices include a display device capable of stereoscopic display with a higher pixel density, that is, a display device capable of high-definition stereoscopic display (hereinafter may be referred to as a "stereoscopic display device"), and a display device capable of displaying different images at a plurality of viewing points. Such display devices include a display portion having an imaging function, and a light control portion having a light control function, and adopt image separation systems such as a lenticular lens system and a parallax barrier system. The parallax barrier system may utilize a laminate of a liquid-crystal barrier panel (hereinafter may be referred to as a "barrier panel") in, for example, a twisted nematic (TN) mode with a relatively narrow viewing angle, and a liquid-crystal display panel (hereinafter may be referred to as a "display panel") in, for example, a vertical alignment (VA) mode or an in-plane switching (IPS) mode. The parallax barrier system requires the optical compensation techniques with superior viewing angle to allow a wider viewing angle and separate images into a left eye and a light eye of the viewer with higher precision. For example, Japanese Patent No. 5648361 discloses disposing commercial viewing-angle compensation films on both sides of a barrier panel to compensate for a viewing angle.

The higher the definition of an image of a display panel applied to, for example, a stereoscopic display device is, the smaller a distance between a pixel formation layer of the display panel and a barrier layer of a barrier panel needs to be to separate images. However, interposing a viewing-angle compensation film between the pixel formation layer and the barrier layer causes a problem with increase in the distance. One solution to the problem is to thin other optical films or a substrate of the display panel or the barrier panel (for example, a glass substrate). However, such a structure creates other problems including increase in the cost due to introduction of an optical film with low versatility, and low productivity and low quality caused by decrease in the strength of the substrate.

In contrast, a structure that eliminates a viewing-angle compensation film causes problems with narrowing a viewing angle allowing stereoscopic view, and reducing the quality of the stereoscopic display device. The similar problems occur not only in the stereoscopic display device but also in a display device including a laminate of a display portion having an imaging function and a liquid-crystal barrier portion and having a wider viewing angle by reducing a distance between a pixel formation layer of the display portion and a barrier layer of the liquid-crystal barrier portion.

SUMMARY

The present invention has been conceived in view of the problems, and the object is to provide a display device with a superior viewing angle without increase in cost, decrease in productivity, and decrease in the quality.

The display device includes a display portion, a liquid-crystal barrier portion, a first polarizing layer, a second polarizing layer, a third polarizing layer, and at least one viewing-angle compensation layer. The liquid-crystal barrier portion is disposed on one side of the display portion, and adjusts an intensity of light of the display portion. The first polarizing layer is disposed opposite to the liquid-crystal barrier portion relative to the display portion. The second polarizing layer is interposed between the display portion and the liquid-crystal barrier portion. The third polarizing layer is disposed opposite to the display portion relative to the liquid-crystal barrier portion. The at least one viewing-angle compensation layer is interposed between the liquid-crystal barrier portion and the third polarizing layer. No viewing-angle compensation layer is interposed between the second polarizing layer and the liquid-crystal barrier portion.

Thus, the display device with a superior viewing angle can be realized without increase in the cost, decrease in the productivity, and decrease in the quality.

BRIEF DESCRIPTION OF THE DRAWINGS

FIG. 5 illustrates horizontal viewing angle characteristics on a luminance contrast ratio;

DESCRIPTION OF THE PREFERRED EMBODIMENTS

Embodiments 1 and 2 of the present invention will be described in detail with reference to the drawings. The terms "parallel" and "perpendicular" will be used for an absorption axis and an orientation axis in the Specification. The terms "parallel" and "perpendicular" involve not only states of being completely parallel and perpendicular but also states of being almost parallel and perpendicular, respectively.

Embodiment 1

Figure 1:
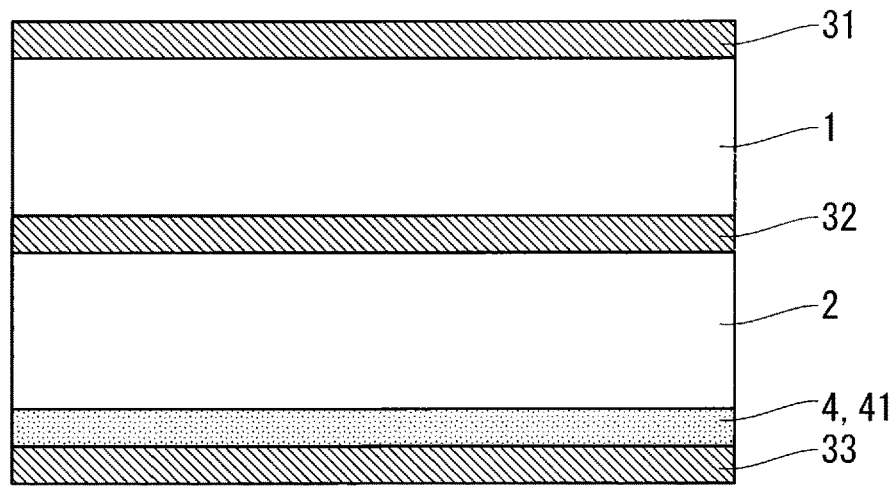
FIG. 1 is a cross section illustrating a structure of a display device according to Embodiment 1.

FIG. 1 is a cross section illustrating a structure of a display device according to Embodiment 1 of the present invention. The display device in FIG. 1 includes a display portion 1, a liquid-crystal barrier portion 2, a first polarizing layer 31, a second polarizing layer 32, a third polarizing layer 33, and at least one viewing-angle compensation layer 4.

The display portion 1 has an imaging function. The display portion 1 is, for example, a liquid-crystal display panel including a liquid-crystal panel in the VA mode or the IPS mode and having a higher pixel density (higher definition).

The liquid-crystal barrier portion 2 is disposed on a light incidence side that is one side of the display portion 1. The liquid-crystal barrier portion 2 includes a plurality of closing and opening portions that are appropriately switchable to a light transmissive region or a light shielding region. This liquid-crystal barrier portion 2 can adjust the intensity of light incident on the display portion 1. The liquid-crystal barrier portion 2 is, for example, a liquid-crystal barrier panel including a liquid-crystal panel in the TN mode.

The first polarizing layer 31 is disposed opposite to the liquid-crystal barrier portion 2 relative to the display portion 1. The second polarizing layer 32 is interposed between the display portion 1 and the liquid-crystal barrier portion 2. The third polarizing layer 33 is disposed opposite to the display portion 1 relative to the liquid-crystal barrier portion 2. For example, polarizing plates obtained by impregnating a stretched polyvinyl alcohol (PVA) with iodide are used as the first polarizing layer 31 to the third polarizing layer 33. The liquid crystals included in the display portion 1 and the liquid-crystal barrier portion 2 are aligned through, for example, rubbing or light irradiation. The liquid crystals are aligned parallel or perpendicular to, for example, absorption axes of the first polarizing layer 31 to the third polarizing layer 33.

The viewing-angle compensation layer 4 is interposed between the liquid-crystal barrier portion 2 and the third polarizing layer 33. The viewing-angle compensation layer 4 includes a first viewing-angle compensation layer 41 that is the first liquid crystal film. Liquid crystal films such as the first liquid crystal film are, for example, hybrid-aligned phase difference films such as a commercial Wide View (WV) film and a New Hybrid (NH) film. These liquid crystal films include, for example, a resin layer made of cellulose triacetate (TAC), a liquid-crystal alignment layer made of polyimide, and a liquid crystal coating layer of discotic liquid crystals or rod-like liquid crystals. For example, rubbing the alignment layer and mixing a liquid-crystal additive can develop desired viewing-angle compensation characteristics.

Figure 2:
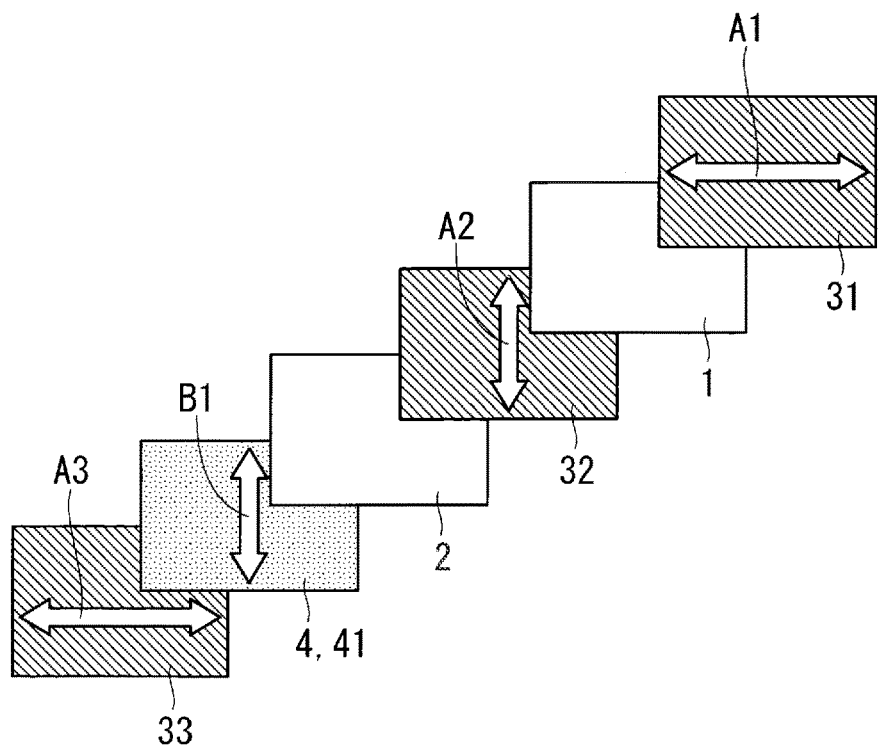
FIG. 2 schematically illustrates the structure of the display device according to Embodiment 1.

FIG. 2 schematically illustrates the absorption axes and the orientation axes of the elements of the display device illustrated in FIG. 1. The first polarizing layer 31 has an absorption axis A1 oriented horizontal. The second polarizing layer 32 has an absorption axis A2 oriented vertical. The third polarizing layer 33 has an absorption axis A3 oriented horizontal. The first viewing-angle compensation layer 41 included in the viewing-angle compensation layer 4 has an orientation axis B1 oriented vertical. In this structure, the orientation axis B1 of the first viewing-angle compensation layer 41 is parallel to the absorption axis A2 of the second polarizing layer 32.

The display devices relevant to Embodiment 1 include viewing-angle compensation layers on both sides of a liquid-crystal barrier panel. In other words, in the context of the structure according to Embodiment 1, the relevant display devices include: one viewing-angle compensation layer interposed between the liquid-crystal barrier portion 2 and the second polarizing layer 32 and having an orientation axis parallel to the absorption axis of the second polarizing layer 32; and another viewing-angle compensation layer interposed between the liquid-crystal barrier portion 2 and the third polarizing layer 33 and having an orientation axis perpendicular to the absorption axis of the second polarizing layer 32. However, this structure has difficulties in reducing the distance between the display portion 1 and the liquid-crystal barrier portion 2.

Thus, the display device according to Embodiment 1 does not include any viewing-angle compensation layer similar to the viewing-angle compensation layer 4 between the display portion 1 and the liquid-crystal barrier portion 2, or precisely between the second polarizing layer 32 and the liquid-crystal barrier portion 2. Instead, the display device according to Embodiment 1 includes the at least one viewing-angle compensation layer 4 interposed between the liquid-crystal barrier portion 2 and the third polarizing layer 33, The orientation axis of the first viewing-angle compensation layer 41 included in the viewing-angle compensation layer 4 is parallel to the absorption axis of the second polarizing layer 32.

Figure 3:
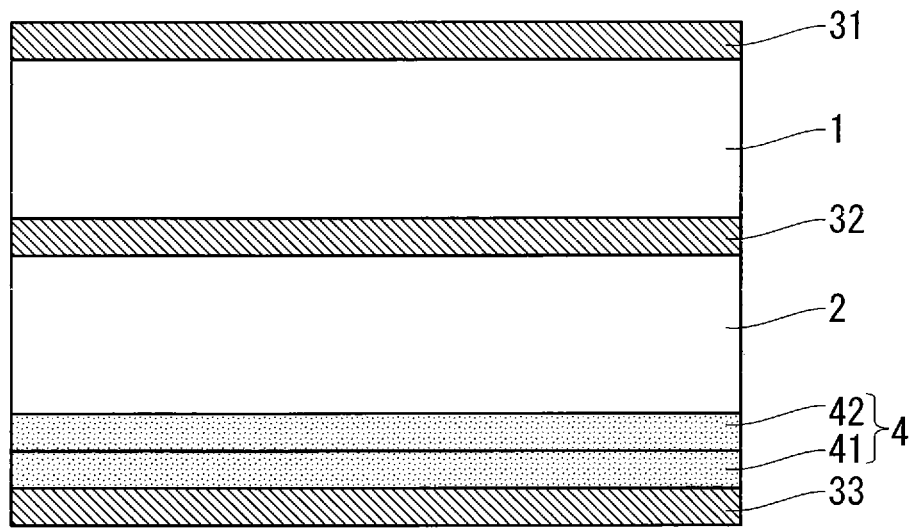
FIG. 3 is a cross section illustrating another structure of the display device according to Embodiment 1.
Figure 4:
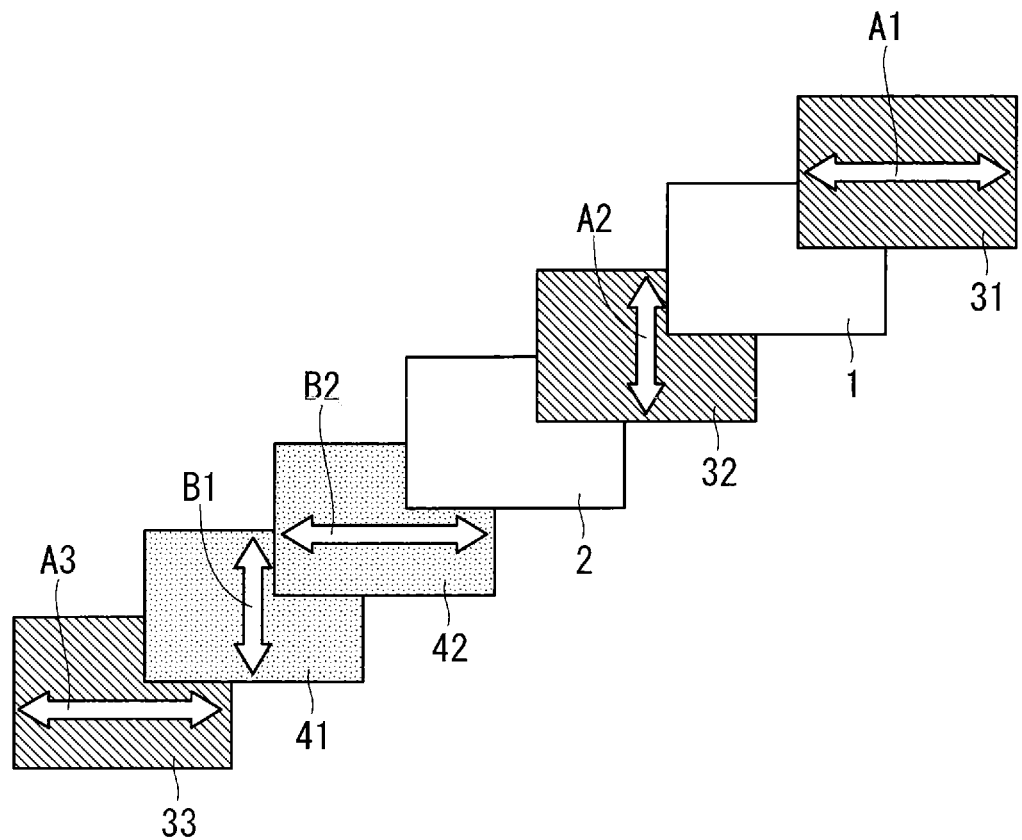
FIG. 4 schematically illustrates the other structure of the display device according to Embodiment 1.

FIG. 3 is a cross section illustrating another structure of the display device according to Embodiment 1. FIG. 4 schematically illustrates the absorption axes and the orientation axes of the elements of the display device illustrated in FIG. 3. The viewing-angle compensation layer 4 of the display device illustrated in FIGS. 3 and 4 further includes a second viewing-angle compensation layer 42 that is the second liquid crystal film. The second viewing-angle compensation layer 42 is interposed between the liquid-crystal barrier portion 2 and the first viewing-angle compensation layer 41. The orientation axis B2 of the second viewing-angle compensation layer 42 is perpendicular to the absorption axis A2 of the second polarizing layer 32. The structure of FIGS. 3 and 4 is the same as that of FIGS. 1 and 2 except that the viewing-angle compensation layer 4 further includes the second viewing-angle compensation layer 42. As is clear from the above description, the orientation axis control and the laminating processes of these viewing-angle compensation layers are not generally known. The second viewing-angle compensation layer 42 may be interposed between the first viewing-angle compensation layer 41 and the third polarizing layer 33, instead of between the liquid-crystal barrier portion 2 and the first viewing-angle compensation layer 41.

The second polarizing layer 32 may be directly bonded to the liquid-crystal barrier portion 2 with a transparent resin. Thus, the second polarizing layer 32 may be partially bonded to, in proximity to, or in contact with the liquid-crystal barrier portion 2. In addition, the transparent resin may be a photosensitive transparent resin. Here, the UV light irradiation from the liquid-crystal barrier portion 2 side causes the curing reaction to proceed. Although the detailed description is omitted herein, the display device may appropriately include components such as a control substrate, a backlight, and a protective plate.

Gist of Embodiment 1

The display device according to Embodiment 1 is effective at compensating for leakage of light in a horizontal direction that is emitted from the display device to reach the viewer, because the orientation axis B1 of the first viewing-angle compensation layer 41 is parallel to the absorption axis A2 of the second polarizing layer 32. The display device according to Embodiment 1 is also effective at compensating for leakage of light in a vertical direction that is emitted from the display device to reach the viewer, because the orientation axis B2 of the second viewing-angle compensation layer 42 is perpendicular to the absorption axis A2 of the second polarizing layer 32.

FIG. 5 illustrates horizontal viewing angle characteristics on a luminance contrast ratio in a structure where the liquid-crystal barrier portion 2 is disposed on the light incidence side of the display portion 1. FIG. 5 clarifies that with the effects, the structure according to Embodiment 1 illustrated in FIGS. 1 and 2 (black triangles in FIG. 5) and another structure according to Embodiment 1 illustrated in FIGS. 3 and 4 (open triangles in FIG. 5) are superior in horizontal viewing angle characteristics on a luminance contrast ratio to the structure that eliminates a viewing-angle compensation film (black circles in FIG. 5), and are closer to the structure relevant to Embodiment 1 of having viewing-angle compensation layers on both sides of a liquid-crystal barrier panel (black rectangles in FIG. 5). Thus, even when excluding the viewing-angle compensation layer between the display portion 1 and the liquid-crystal bonier portion 2, the display device with a superior viewing angle can be realized without increase in the cost, decrease in the productivity, and decrease in the quality according to Embodiment 1.

Embodiment 2

Figure 6:
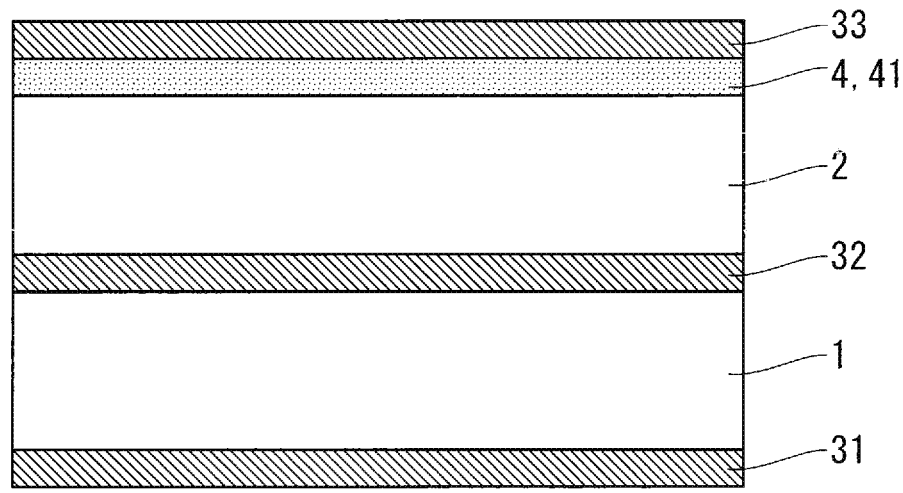
FIG. 6 is a cross section illustrating a structure of a display device according to Embodiment 2.

FIG. 6 is a cross section illustrating a structure of a display device according to Embodiment 2 of the present invention. Among the constituent elements to be described in Embodiment 2, the same or similar constituent elements as those according to Embodiment 1 will have the same reference numerals, and the different constituent elements will be mainly described.

In the structure of FIG. 6, the liquid-crystal barrier portion 2 is disposed on a light exit side that is the other side of the display portion 1. This liquid-crystal barrier portion 2 can adjust the intensity of the light emitting from the display portion 1.

Figure 7:
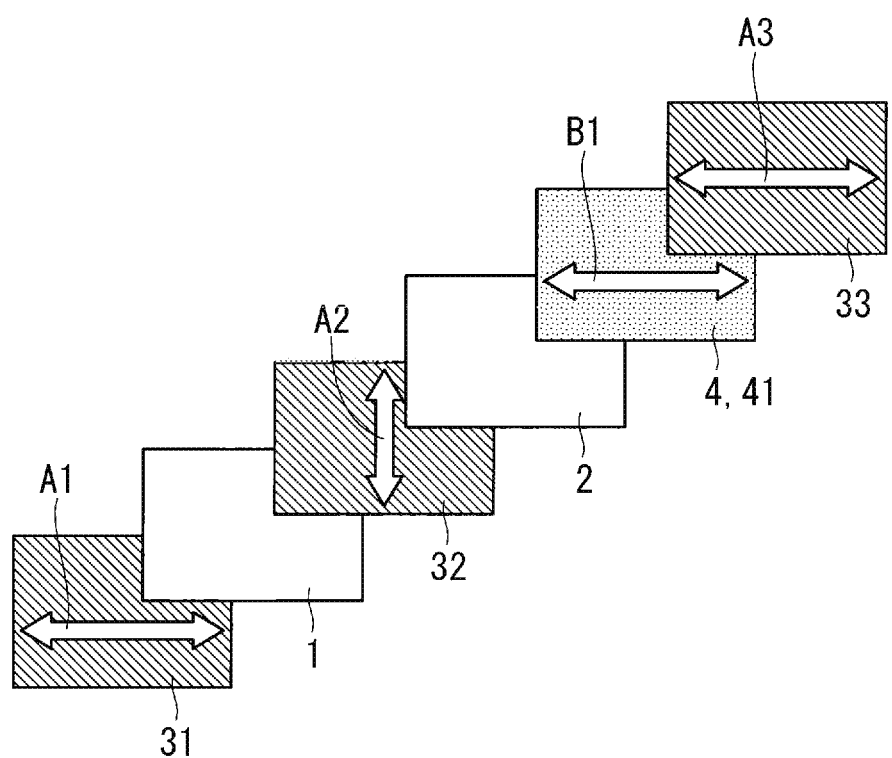
FIG. 7 schematically illustrates the structure of the display device according to Embodiment 2.

FIG. 7 schematically illustrates the absorption axes and the orientation axes of the elements of the display device illustrated in FIG. 6. The first polarizing layer 31 has the absorption axis A1 oriented horizontal. The second polarizing layer 32 has the absorption axis A2 oriented vertical. The third polarizing layer 33 has the absorption axis A3 oriented horizontal. The first viewing-angle compensation layer 41 included in the viewing-angle compensation layer 4 has the orientation axis B1 oriented horizontal. In this structure, the orientation axis B1 of the first viewing-angle compensation layer 41 is perpendicular to the absorption axis A2 of the second polarizing layer 32.

The structure of FIGS. 6 and 7 is the same as that of FIGS. 1 and 2 except that the liquid-crystal barrier portion 2 is disposed on the light exit side of the display portion 1 and that the orientation axis of the first viewing-angle compensation layer 41 included in the viewing-angle compensation layer 4 is perpendicular to the absorption axis of the second polarizing layer 32.

Figure 8:
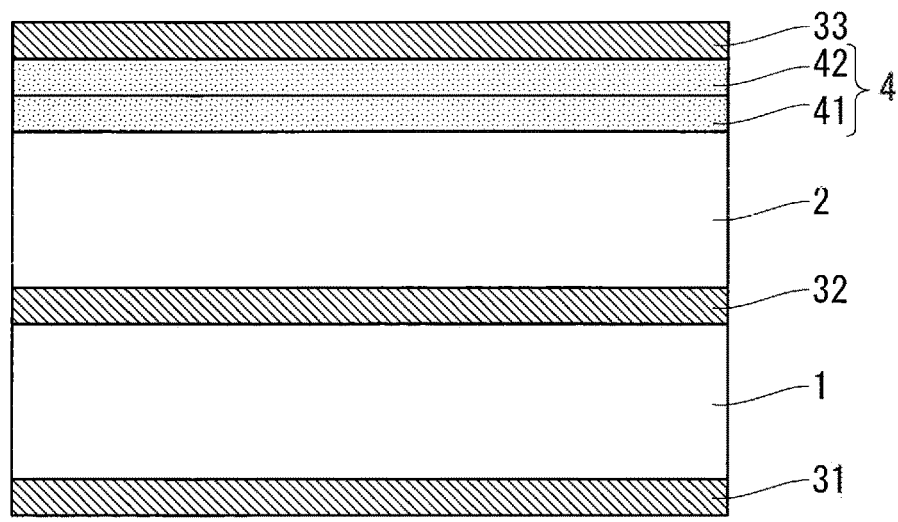
FIG. 8 is a cross section illustrating another structure of the display device according to Embodiment 2.
Figure 9:
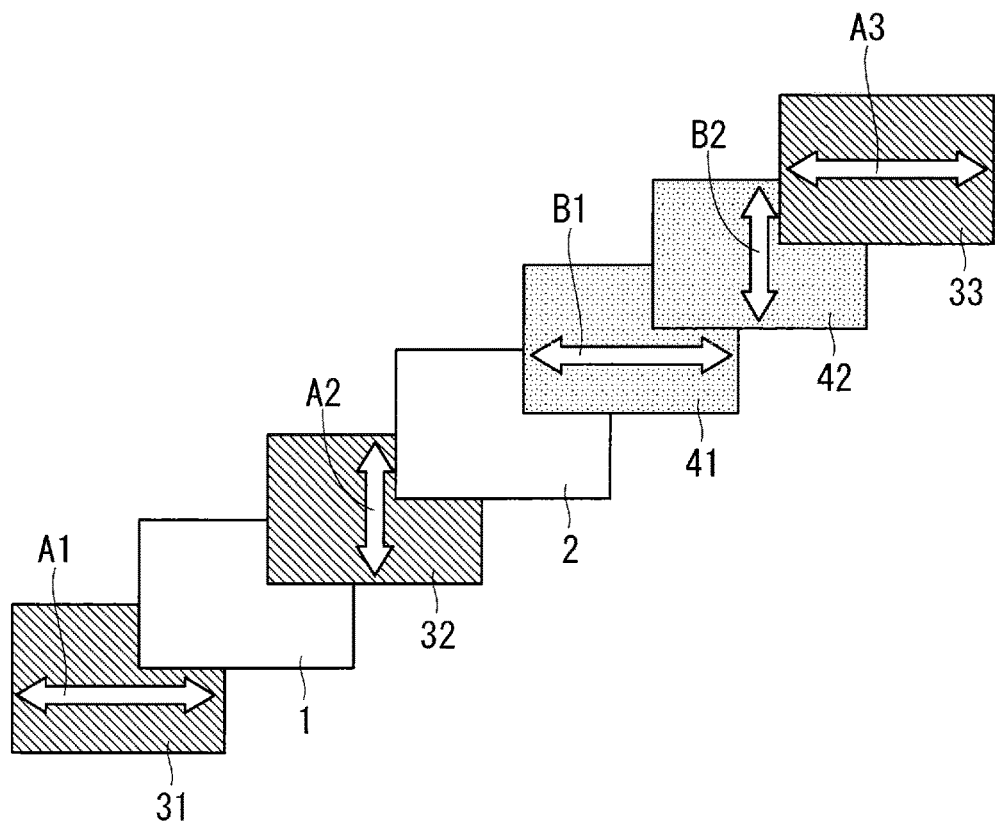
FIG. 9 schematically illustrates the other structure of the display device according to Embodiment 2.

FIG. 8 is a cross section illustrating another structure of the display device according to Embodiment 2. FIG. 9 schematically illustrates the absorption axes and the orientation axes of the elements of the display device illustrated in FIG. 8. The viewing-angle compensation layer 4 of the display device illustrated in FIGS. 8 and 9 further includes the second viewing-angle compensation layer 42 that is the second liquid crystal film. The second viewing-angle compensation layer 42 is interposed between the third polarizing layer 33 and the first viewing-angle compensation layer 41. The orientation axis B2 of the second viewing-angle compensation layer 42 is parallel to the absorption axis A2 of the second polarizing layer 32. The structure of FIGS. 8 and 9 is the same as that of FIGS. 6 and 7 except that the viewing-angle compensation layer 4 further includes the second viewing-angle compensation layer 42. The second viewing-angle compensation layer 42 may be interposed between the first viewing-angle compensation layer 41 and the liquid-crystal barrier portion 2, instead of between the third polarizing layer 33 and the first viewing-angle compensation layer 41.

Gist of Embodiment 2

The display device according to Embodiment 2 is effective at compensating for leakage of light in a horizontal direction that is emitted from the display device to reach the viewer, because the orientation axis B1 of the first viewing-angle compensation layer 41 is perpendicular to the absorption axis A2 of the second polarizing layer 32. The display device according to Embodiment 2 is also effective at compensating for leakage of light in a vertical direction that is emitted from the display device to reach the viewer, because the orientation axis B2 of the second viewing-angle compensation layer 42 is parallel to the absorption axis A2 of the second polarizing layer 32.

Figure 10:
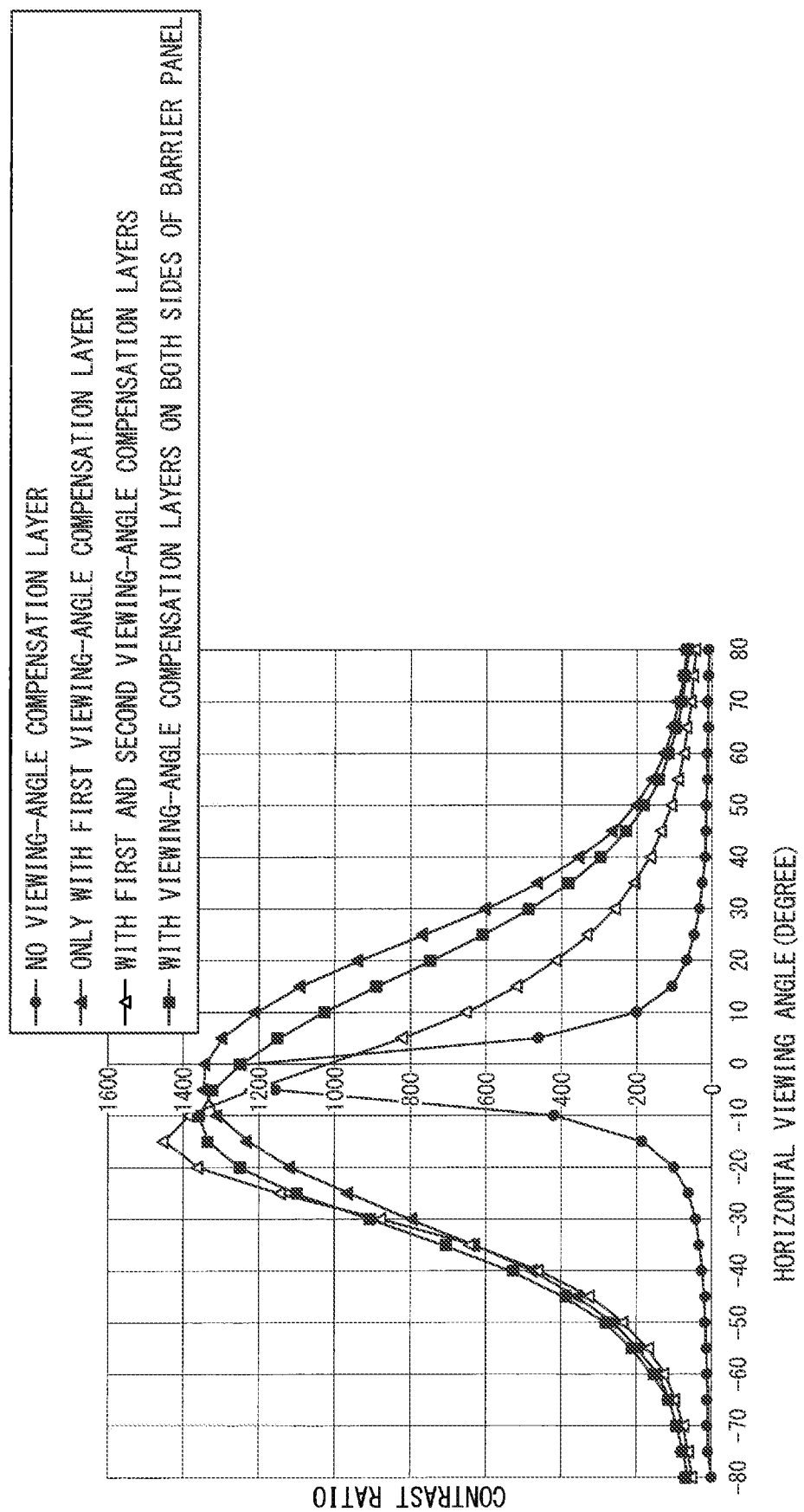
FIG. 10 illustrates horizontal viewing angle characteristics on a luminance contrast ratio.

FIG. 10 illustrates horizontal viewing angle characteristics on a luminance contrast ratio in a structure where the liquid-crystal barrier portion 2 is disposed on the light exit side of the display portion 1. FIG. 10 clarifies that with the effects, the structure according to Embodiment 2 illustrated in FIGS. 6 and 7 (black triangles in FIG. 10) and another structure according to Embodiment 2 illustrated in FIGS. 8 and 9 (open triangles in FIG. 10) are superior in horizontal viewing angle characteristics on a luminance contrast ratio to the structure that eliminates a viewing-angle compensation film (black circles in FIG. 10), and are closer to the structure relevant to Embodiment 2 of having viewing-angle compensation layers on both sides of a liquid-crystal barrier panel (black rectangles in FIG. 10). Thus, even when excluding the viewing-angle compensation layer between the display portion 1 and the liquid-crystal barrier portion 2, the display device with a superior viewing angle can be realized without increase in the cost, decrease in the productivity, and decrease in the quality according to Embodiment 2.

FIG. 10 shows a result of a wider horizontal viewing angle in the structure including only the first viewing-angle compensation layer 41 (black triangles in FIG. 10). However, the vertical viewing angle that is not illustrated is relatively narrower in such a structure. The angles less than or equal to 10 percent of the front contrast ratio (hereinafter referred to as "10-percent-or-less angles") range from 15 degrees for the upper side to 20 degrees for the lower side with respect to the origin. The 10-percent-or-less angles in the structure including both the first viewing-angle compensation layer 41 and the second viewing-angle compensation layer 42 range from 45 degrees for the upper side to 60 degrees for the lower side with respect to the origin. The 10-percent-or-less angles in the structure relevant to Embodiment 2 of having viewing-angle compensation layers on both sides of the liquid-crystal barrier panel range from 60 degrees for the upper side to 65 degrees for the lower side with respect to the origin. Consequently, the structure including both the first viewing-angle compensation layer 41 and the second viewing-angle compensation layer 42 can improve not only the horizontal viewing angle but also the vertical viewing angle. The same holds true for the structure including both the first viewing-angle compensation layer 41 and the second viewing-angle compensation layer 42 according to Embodiment 1.

[Modifications]

Although describing the viewing-angle compensation in the laminate of the liquid-crystal display panel and the liquid-crystal barrier panel, Embodiments 1 and 2 are not limited to this. For example, replacing the liquid-crystal display panel with a panel mounting self-luminescent elements such as an organic electroluminescence panel as a display portion can produce the same advantages as those according to Embodiments 1 and 2. Since such a structure requires disposing a liquid-crystal barrier portion at a light exit side of the self-luminescent elements, the liquid-crystal barrier portion needs to be disposed on a light exit side of the panel mounting self-luminescent elements.

Within the scope of the present invention, Embodiments and Modifications can be freely combined, and each of Embodiments and Modifications can be appropriately modified or omitted.

What is claimed is:

1. A stereoscopic display device, comprising:
   a display portion;
   a liquid-crystal barrier portion being disposed on one side of the display portion, and adjusting an intensity of light of the display portion;
   a first polarizing layer disposed opposite to the liquid-crystal barrier portion relative to the display portion, a second polarizing layer interposed between the display portion and the liquid-crystal barrier portion, and a third polarizing layer disposed opposite to the display portion relative to the liquid-crystal barrier portion; and
   at least one viewing-angle compensation layer interposed between the liquid-crystal barrier portion and the third polarizing layer, wherein
   no viewing-angle compensation layer is interposed between the second polarizing layer and the liquid-crystal barrier portion,
   the second polarizing layer is directly bonded to the liquid-crystal barrier portion with a photosensitive transparent resin,
   the display portion includes a liquid-crystal panel in a vertical alignment mode or an in-plane switching mode,
   the liquid-crystal barrier portion includes a liquid-crystal panel in a twisted nematic mode,
   the display portion and the liquid-crystal barrier portion separate images to form a stereoscopic image,
   the liquid-crystal barrier portion is disposed on a light incidence side of the display portion,
   the at least one viewing-angle compensation layer includes a first liquid crystal film that is a liquid crystal film having an orientation axis parallel to an absorption axis of the second polarizing layer, and
   the at least one viewing-angle compensation layer further includes a second liquid crystal film interposed between the liquid-crystal barrier portion and the first liquid crystal film, the second liquid crystal film being a liquid crystal film having an orientation axis perpendicular to the absorption axis of the second polarizing layer.

2. The stereoscopic display device according to claim 1, wherein the number of said second polarizing layer is one.

* * * * *